(12) United States Patent  
Matsumoto et al.

(10) Patent No.: US 11,711,609 B2
(45) Date of Patent: Jul. 25, 2023

(54) IMAGE PICKUP APPARATUS AND INFORMATION PROCESSING APPARATUS THAT ARE CAPABLE OF AUTOMATICALLY ADDING APPROPRIATE ROTATION MATRIX DURING PHOTOGRAPHING, CONTROL METHOD FOR IMAGE PICKUP APPARATUS, AND STORAGE MEDIUM

(71) Applicant: CANON KABUSHIKI KAISHA, Tokyo (JP)

(72) Inventors: Mizuki Matsumoto, Tokyo (JP); Shuichi Hosokawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/842,638

(22) Filed: Jun. 16, 2022

(65) Prior Publication Data

US 2022/0408010 A1 Dec. 22, 2022

(30) Foreign Application Priority Data

Jun. 21, 2021 (JP) ................................. 2021-102464

(51) Int. Cl.
*H04N 23/661* (2023.01)
*H04N 23/80* (2023.01)
(Continued)

(52) U.S. Cl.
CPC ......... *H04N 23/661* (2023.01); *H04N 23/667* (2023.01); *H04N 23/695* (2023.01); *H04N 23/80* (2023.01)

(58) Field of Classification Search
CPC ... H04N 23/661; H04N 23/667; H04N 23/695
See application file for complete search history.

(56) References Cited

U.S. PATENT DOCUMENTS

2010/0141991 A1* 6/2010 Yoshida ............... H04N 1/3878
358/1.18
2011/0261216 A1* 10/2011 Mori .................. H04N 21/4334
348/220.1
(Continued)

FOREIGN PATENT DOCUMENTS

JP 2009-542059 A 11/2009
JP 2017-118446 A 6/2017

*Primary Examiner* — Chiawei Chen
(74) *Attorney, Agent, or Firm* — Canon U.S.A., Inc. IP Division

(57) ABSTRACT

An apparatus includes a pickup unit, a detecting unit configured to detect an attitude of the pickup unit, a rotation matrix generating unit configured to generate a rotation matrix, an encoder configured to encode image data of the moving image, a selecting unit configured to select one rotation matrix generating method from the plurality of rotation matrix generating methods according to an operation mode of the pickup unit when the moving image is photographed by the pickup unit, and a file generating unit configured to generate a data file by including the rotation matrix, which is generated by means of the selected rotation matrix generating method, in the encoded image data in a format, in which the angle when the reproducing apparatus displays the moving image can be corrected by the rotation matrix.

20 Claims, 7 Drawing Sheets

(51) Int. Cl.
*H04N 23/667* (2023.01)
*H04N 23/695* (2023.01)

(56) References Cited

U.S. PATENT DOCUMENTS

| | | | |
|---|---|---|---|
| 2014/0146205 A1* | 5/2014 | Xu | H04N 23/683 348/239 |
| 2016/0205308 A1* | 7/2016 | Maeda | H04N 1/00129 348/207.11 |
| 2019/0158813 A1* | 5/2019 | Rowell | H04N 13/111 |
| 2020/0244888 A1* | 7/2020 | Tsai | H04N 23/6811 |
| 2021/0029343 A1* | 1/2021 | Hamada | H04N 23/60 |
| 2021/0029386 A1* | 1/2021 | Hamada | H04N 21/233 |

* cited by examiner

FIG. 3A matrix = { a, b, u, c, d, v, x, y, w };

FIG. 3B

AFFINE TRANSFORMATION MATRIX: $\begin{pmatrix} a & b & u \\ c & d & v \\ x & y & w \end{pmatrix}$

$\begin{bmatrix} 0\text{x}00010000 & 0\text{x}00000000 & 0\text{x}00000000 \\ 0\text{x}00000000 & 0\text{x}00010000 & 0\text{x}00000000 \\ 0\text{x}00000000 & 0\text{x}00000000 & 0\text{x}40000000 \end{bmatrix}$

$\begin{bmatrix} 0\text{x}00000000 & 0\text{x}00010000 & 0\text{x}00000000 \\ 0\text{x}00010000 & 0\text{x}00000000 & 0\text{x}00000000 \\ 0\text{x}00000000 & 0\text{x}00000000 & 0\text{x}40000000 \end{bmatrix}$

$\begin{bmatrix} 0\text{xFFFF}0000 & 0\text{x}00000000 & 0\text{x}00000000 \\ 0\text{x}00000000 & 0\text{xFFFF}0000 & 0\text{x}00000000 \\ 0\text{x}00000000 & 0\text{x}00000000 & 0\text{x}40000000 \end{bmatrix}$

$\begin{bmatrix} 0\text{x}00000000 & 0\text{xFFFF}0000 & 0\text{x}00000000 \\ 0\text{x}00010000 & 0\text{x}00000000 & 0\text{x}00000000 \\ 0\text{x}00000000 & 0\text{x}00000000 & 0\text{x}40000000 \end{bmatrix}$

IMAGE PICKUP APPARATUS AND INFORMATION PROCESSING APPARATUS THAT ARE CAPABLE OF AUTOMATICALLY ADDING APPROPRIATE ROTATION MATRIX DURING PHOTOGRAPHING, CONTROL METHOD FOR IMAGE PICKUP APPARATUS, AND STORAGE MEDIUM

BACKGROUND

Technical Field

The aspect of the embodiments relates to an image pickup apparatus and an information processing apparatus that are capable of automatically adding an appropriate rotation matrix during photographing, a control method for the image pickup apparatus, and a storage medium.

Description of the Related Art

Some electronic apparatuses such as digital cameras and smartphones that have an image pickup function are equipped with an acceleration sensor. In photographing performed by such an electronic apparatus, for example, when performing moving image photographing, an attitude of the electronic apparatus is detected by the acceleration sensor. Then, information that indicates how much the moving image is rotated and displayed when reproduction display of the photographed moving image is performed (hereinafter referred to as "a rotation matrix") is obtained based on the detected attitude of the electronic apparatus, and the obtained rotation matrix is embedded in a moving image data file so as to be stored. Further, a reproducing apparatus, which reproduces the moving image, rotates and displays the moving image by using the rotation matrix within the moving image data file when reproducing the moving image. As a result, it is possible to reduce a feeling of wrongness when reproducing the moving image.

However, in the case of performing photographing with a photographing direction facing directly above or below (to the sky or the ground), or in the case of starting photographing from a state where the electronic apparatus is not tilted and tilting the electronic apparatuses during the photographing, sometimes a rotation matrix different from a photographer's expectation is added.

In order to solve this issue, Japanese Laid-Open Patent Publication (Translation of PCT International Application) No. 2009-542059 discloses a technique that determines a rotation matrix of moving image data being photographed by a main camera based on the orientation of the photographer's face inputted from an auxiliary camera (an in-camera). Further, Japanese Laid-Open Patent Publication (kokai) No. 2017-118446 discloses a technique that receives a trigger signal for recording a still image during photographing, and records an attitude at the time of receiving the trigger signal, and only moving image photographed in an attitude, which accords with an attitude when receiving the trigger signal, among moving images recorded before receiving the trigger signal on a recording medium.

According to the technique disclosed in Japanese Laid-Open Patent Publication (Translation of PCT International Application) No. 2009-542059, it is possible to automatically add the rotation matrix intended by the photographer. However, in addition to the main camera, the auxiliary camera that photographs the photographer's face during photographing is required. Further, according to the technique disclosed in Japanese Laid-Open Patent Publication (kokai) No. 2017-118446, it is possible to record only a part, to which the rotation matrix intended by the photographer is added. However, it is necessary to input the trigger signal for determining a rotation amount during photographing, and it cannot be determined automatically. In addition, moving images that are different from the attitude when receiving the trigger signal are deleted.

SUMMARY

The aspect of the embodiments provides an apparatus comprising a pickup unit, a detecting unit configured to detect an attitude of the pickup unit, a rotation matrix generating unit configured to generate a rotation matrix, which is used for correcting an angle when a reproducing apparatus displays a moving image photographed by the pickup unit, by means of one of a plurality of rotation matrix generating methods and based on the detected attitude, an encoder configured to encode image data of the moving image, a selecting unit configured to select one rotation matrix generating method from the plurality of rotation matrix generating methods according to an operation mode of the pickup unit when the moving image is photographed by the pickup unit, and a file generating unit configured to generate a data file by including the rotation matrix, which is generated by means of the selected rotation matrix generating method, in the encoded image data in a format, in which the angle when the reproducing apparatus displays the moving image can be corrected by the rotation matrix.

Further features of the disclosure will become apparent from the following description of exemplary embodiments with reference to the attached drawings.

BRIEF DESCRIPTION OF THE DRAWINGS

FIGS. 3A, 3B, 3C, 3D, 3E, and 3F are diagrams that explain a rotation matrix generated with respect to moving image data.

DESCRIPTION OF THE EMBODIMENTS

The disclosure will now be described in detail below with reference to the accompanying drawings showing embodiments thereof.

Here, a configuration in which the aspect of the embodiments is embodied as an image pickup apparatus will be described. Although a so-called digital camera can be mentioned as a representative example of the image pickup apparatus, the image pickup apparatus according to the disclosure is not limited to the digital camera, and may be an electronic apparatus having an image pickup function such as a smartphone or a tablet PC.

Figure 1:
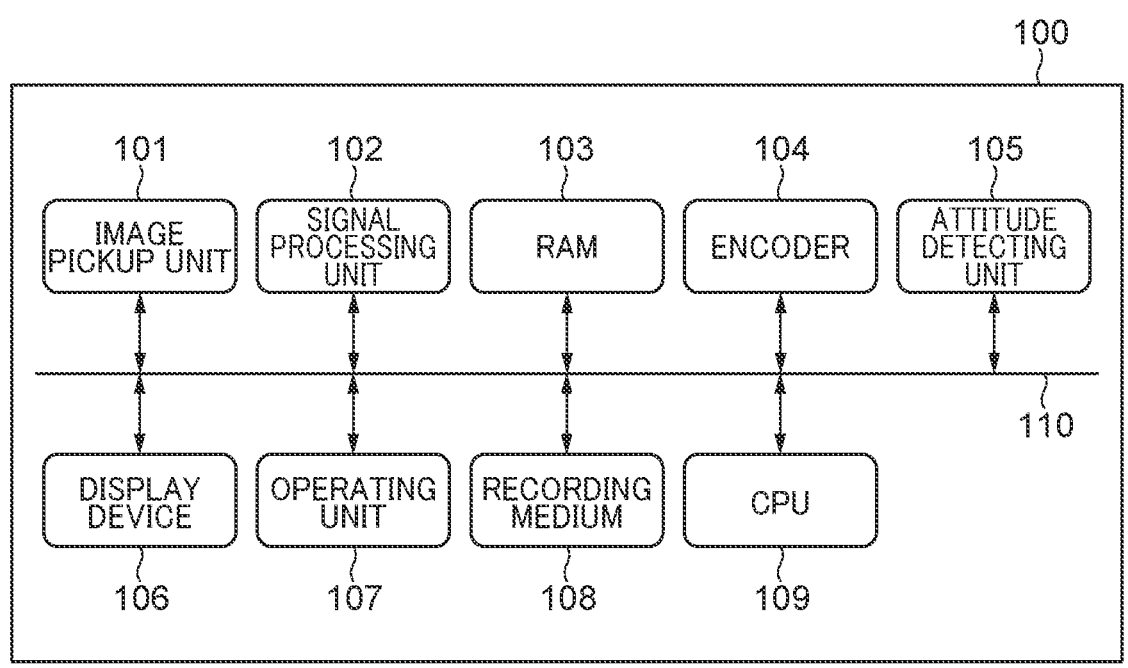
FIG. 1 is a block diagram that shows a schematic configuration of an image pickup apparatus according to a first embodiment of the disclosure.

First, a first embodiment of the disclosure will be described. FIG. 1 is a block diagram that shows a schematic configuration of an image pickup apparatus 100 according to the first embodiment of the disclosure. The image pickup apparatus 100 includes an image pickup unit 101, a signal processing unit 102, a RAM (Random Access Memory) 103, an encoder 104, an attitude detecting unit 105, a display device 106, an operating unit 107, a recording medium 108, and a CPU (Central Processing Unit) 109, which are communicably connected to each other via a bus 110.

The image pickup unit 101 includes a photographing optical system (not shown), an image pickup element (not shown) that converts an optical image formed through the photographing optical system into analog electrical signals, and a signal converting unit (not shown) that converts the analog electrical signals outputted from the image pickup element (an image sensor) into digital data to generate image data. Moreover, in the first embodiment of the disclosure, "the image data" is a concept that includes not only still image data but also moving image data (video data). The image pickup unit 101 outputs the generated image data to the signal processing unit 102. The signal processing unit 102 performs various kind of image processing with respect to the image data obtained from the image pickup unit 101, and outputs the image data after the image processing to the RAM 103. The image pickup unit 101 and the signal processing unit 102 constitutes an image generating unit in the image pickup apparatus 100.

The RAM 103 is a storage unit that temporarily stores the image data after the image processing which is outputted from the signal processing unit 102, and temporarily stores the image data encoded by the encoder 104 until it is stored in the recording medium 108. The encoder 104 performs a compression encoding processing with respect to the image data, which is processed by the signal processing unit 102 and is temporarily stored in the RAM 103, and outputs the encoded image data to the RAM 103.

The attitude detecting unit 105 is, for example, a gyro sensor or the like, and detects an attitude of the image pickup apparatus 100. Moreover, since an attitude detecting method by using a gyro sensor or the like is publicly known, the description thereof will be omitted. The display device 106 is, for example, a liquid crystal display device or an organic EL (electroluminescent) display device, and displays setting menus of various kinds of functions of the image pickup apparatus 100, live view videos, still images photographed, and moving images photographed. Further, a touch panel (not shown) that functions as the operating unit 107 is superimposed on the display device 106, and a user can input various kinds of instructions into the image pickup apparatus 100 (the CPU 109) by a touching operation on the touch panel. The operating unit 107 may further include mechanical switches and mechanical buttons. The recording medium 108 is a memory card that can be attached to and detached from the image pickup apparatus 100, and stores the encoded image data, etc. as image files.

The CPU 109 expands a program stored in its own ROM (Read Only Memory) (not shown) on its own RAM (not shown) and controls the operation of each part constituting the image pickup apparatus 100, thereby performs overall control of the image pickup apparatus 100. In the first embodiment of the disclosure, the CPU 109 functions as a rotation matrix generating unit that generates a rotation matrix by using the attitude detection result of the image pickup apparatus 100 obtained by the attitude detecting unit 105, and also functions as a moving image file generating unit that generates a moving image data file. The rotation matrix generating unit generates the rotation matrix by means of one of a plurality of rotation matrix generating methods. Further, the CPU 109 also functions as a selecting unit and a file generating unit. The definition of "the rotation matrix" is as described above in the related art.

Moreover, as the configuration of the image pickup apparatus 100, although a configuration in which the image pickup unit 101 is integrally provided in the image pickup apparatus 100 is adopted here, the image pickup apparatus according to the disclosure is not limited to such a configuration. For example, the image pickup apparatus according to the disclosure may be configured by such a way, that is, the image pickup unit 101 and an information processing apparatus, which includes each part other than the image pickup unit 101, are physically separate and can communicate with each other. In this case, the signal processing unit 102 may be provided on the image pickup unit 101 side instead of the information processing apparatus side. Further, the information processing apparatus includes an obtaining unit that obtains a moving image photographed by the image pickup unit 101 together with attitude information, which indicates an attitude of the image pickup unit 101 at the time of photographing the moving image.

Figure 2:
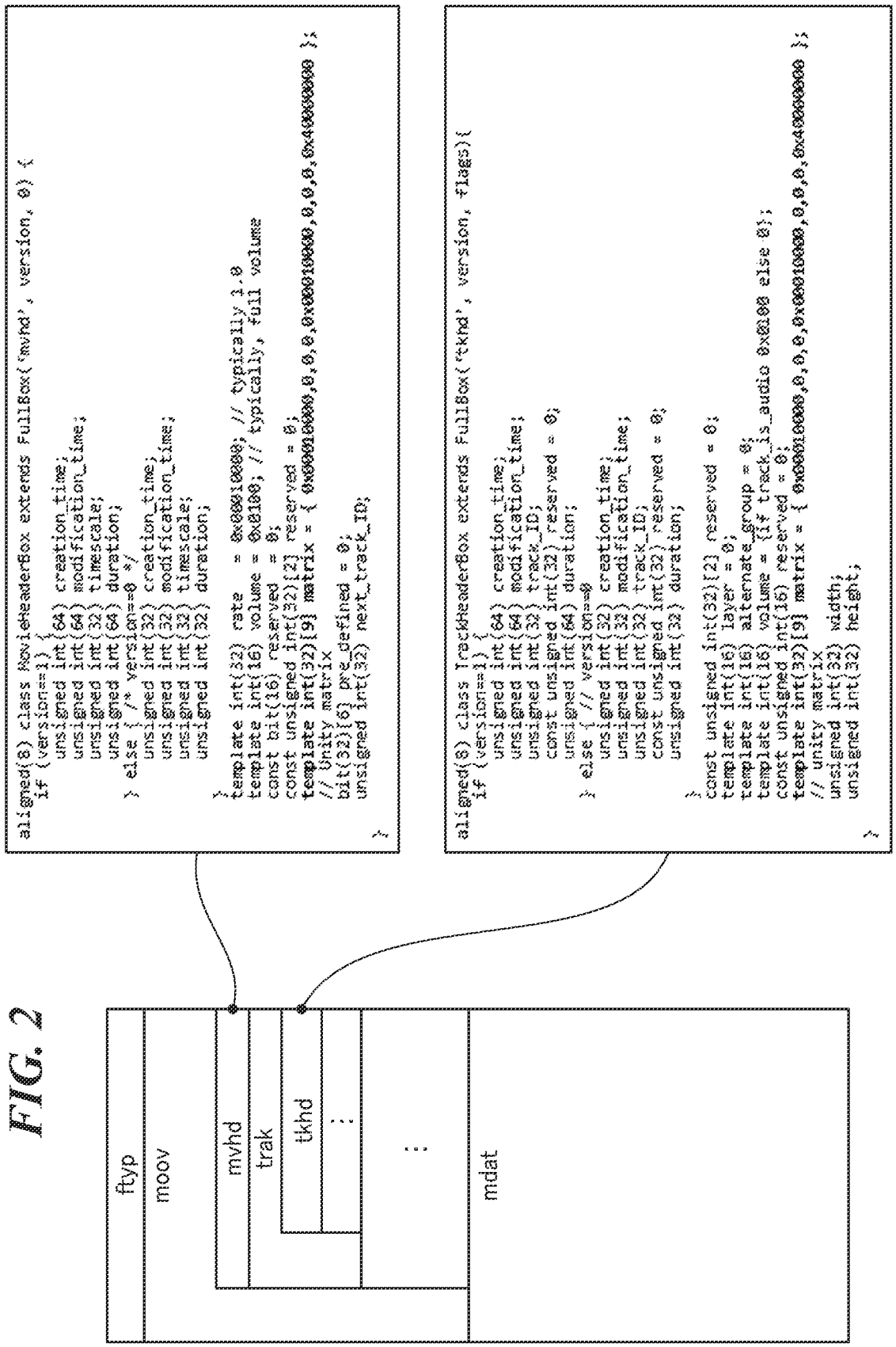
FIG. 2 is a diagram that explains a format of a moving image data file.

FIG. 2 is a diagram that explains a format of the moving image data file generated by the image pickup apparatus 100. Moreover, the details of the format of the moving image data file are described in "ISO/IEC 14496-12 ISO base media file format", so only a brief explanation is given here.

A moving image data file is composed of "ftyp" that is a header part, "moov" that is a meta information storage part, and "mdat" that is a storage part of moving image data and time code data. The "mdat" is composed of video chunks in which one or a plurality of video samples, which are encoding results of the encoder 104, are collected. Although only the video sample is dealt with in the first embodiment of the disclosure, a time code sample or an audio sample may exist. Further, a set of chunks of the same type of sample is called a track.

The "moov" is meta data about sample data within the "mdat". The meta data includes those that relate to the entire moving image data file and those that are bundled with each track. For example, "mvhd" shown in FIG. 2 is one of the meta data relating to the entire moving image data file, and "tkhd" shown in FIG. 2 is one of the meta data for the track.

The "mvhd" exemplified in FIG. 2 includes a rotation matrix that relates to the corresponding moving image data file, and the "tkhd" exemplified in FIG. 2 includes a rotation matrix that relates to the corresponding track. The substance of the rotation matrix is an affine transformation matrix. Further, the rotation matrix is meta data for correcting a display angle (rotating the image by a predetermined angle) and displaying the image when a reproducing apparatus corresponding to the format of the moving image data file described above reproduces the moving image. The reproducing apparatus displays the image by performing an affine transformation with respect to the original image by using the rotation matrix.

The rotation matrix is shown in FIG. 2 as a one-dimensional array named "matrix". The number of elements in the one-dimensional array is 9, and the size of one element is 32 bits. FIGS. 3A and 3B are diagrams that explain the correspondence between the elements of the one-dimensional array and the affine transformation matrix. All of a, b, u, c, d, v, x, y, w that are shown in FIGS. 3A and 3B are fixed-point data, the upper 16 bits of a, b, c, d, x, y represent integer parts, and the lower 16 bits of a, b, c, d, x, y represent fractional parts. On the other hand, the upper 2 bits of u, v, w represent integer parts, and the lower 30 bits of u, v, w represent fractional parts. Moreover, FIGS. 3C, 3D, 3E, and 3F will be described later.

In the "moov", there are "stsd", "stsz", and "stco" (all of which are not shown in FIG. 2) as the meta data of each track. The "stsd" indicates a judgement of the track type and the details of the stored data. In the case that the track type is a video track, the "stsd" indicates information such as an encoding format, the angle of view, a sampling frequency, etc. Further, in the case that the track type is a time code track, the "stsd" indicates information such as a sampling frequency of the sample, a synchronization relationship with the video sample, etc. The "stsz" indicates the data length of each sample data. Furthermore, the "stco" indicates an offset from the beginning of the file of each chunk.

Next, a recording processing of the moving image data in the image pickup apparatus 100 will be described. Here, it is assumed that a normal frame rate of the video sample is 60 fps. On the other hand, it is assumed that a frame rate (an image pickup rate) in a mode, which performs photographing at a low frame rate, is 0.05 fps (one frame every 20 seconds). In a mode in which the frame rate can be changed, it is assumed that recording is started at 60 fps and the recording is performed at 120 fps after the frame rate is changed. Hereinafter, the operation mode having the low frame rate is referred to as "a time lapse mode", and the operation mode in which the frame rate can be changed is referred to as "a high frame rate mode". Further, the operation mode having the normal frame rate is referred to as "a normal mode".

Figure 4:
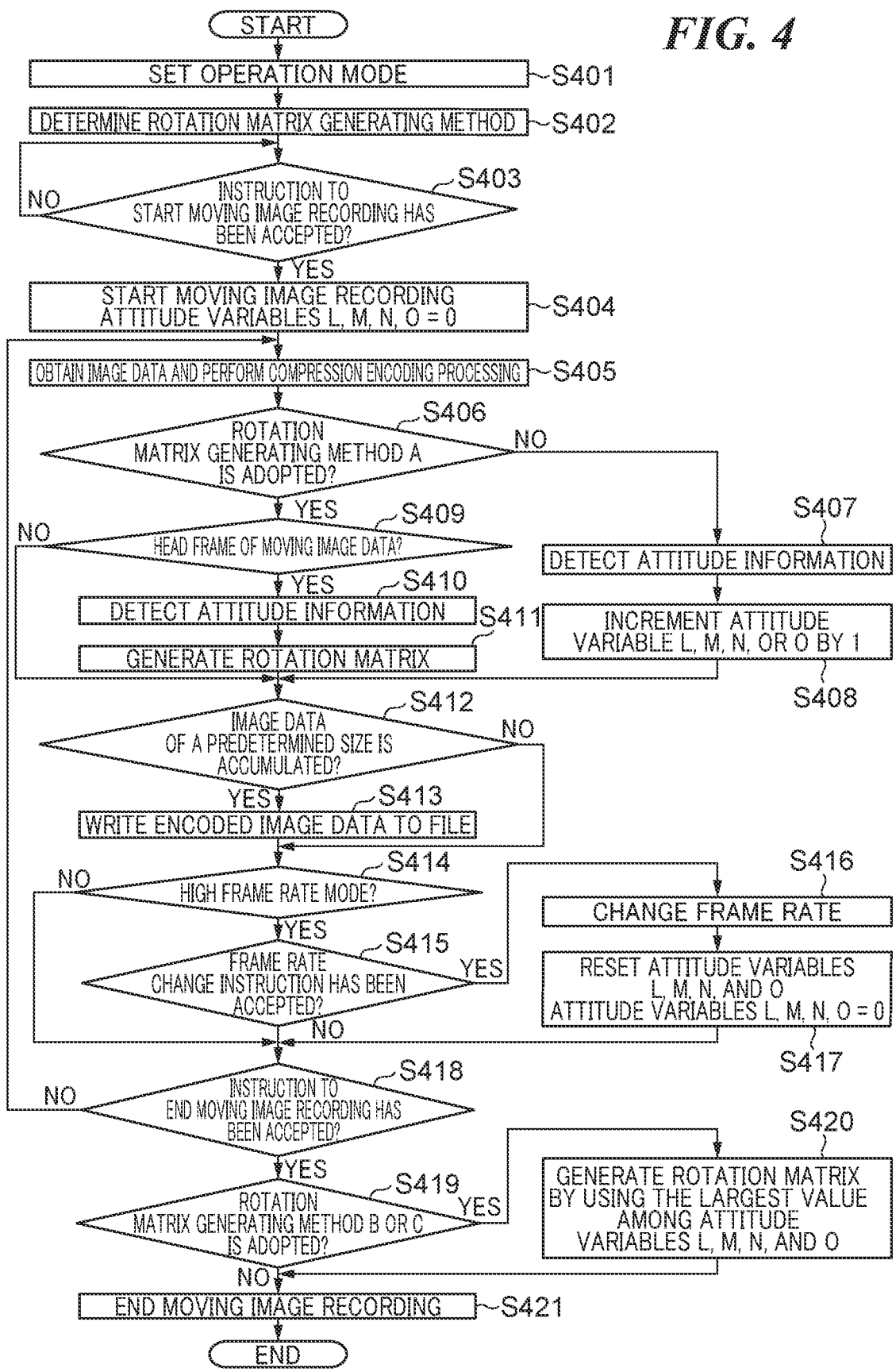
FIG. 4 is a flowchart that explains a recording processing of the moving image data in the image pickup apparatus.

FIG. 4 is a flowchart that explains the recording processing of the moving image data in the image pickup apparatus 100. Each processing (step) indicated by the S number in FIG. 4 is realized by the CPU 109 expanding the program stored in its own ROM on its own RAM and integrally controlling the operation of each block of the image pickup apparatus 100.

In S401, the CPU 109 sets the moving image photographing mode to a mode, which is inputted by the user through the operating unit 107. As a result, the moving image photographing mode is set to any one mode of the normal mode, the time lapse mode, and the high frame rate mode.

Figure 5:
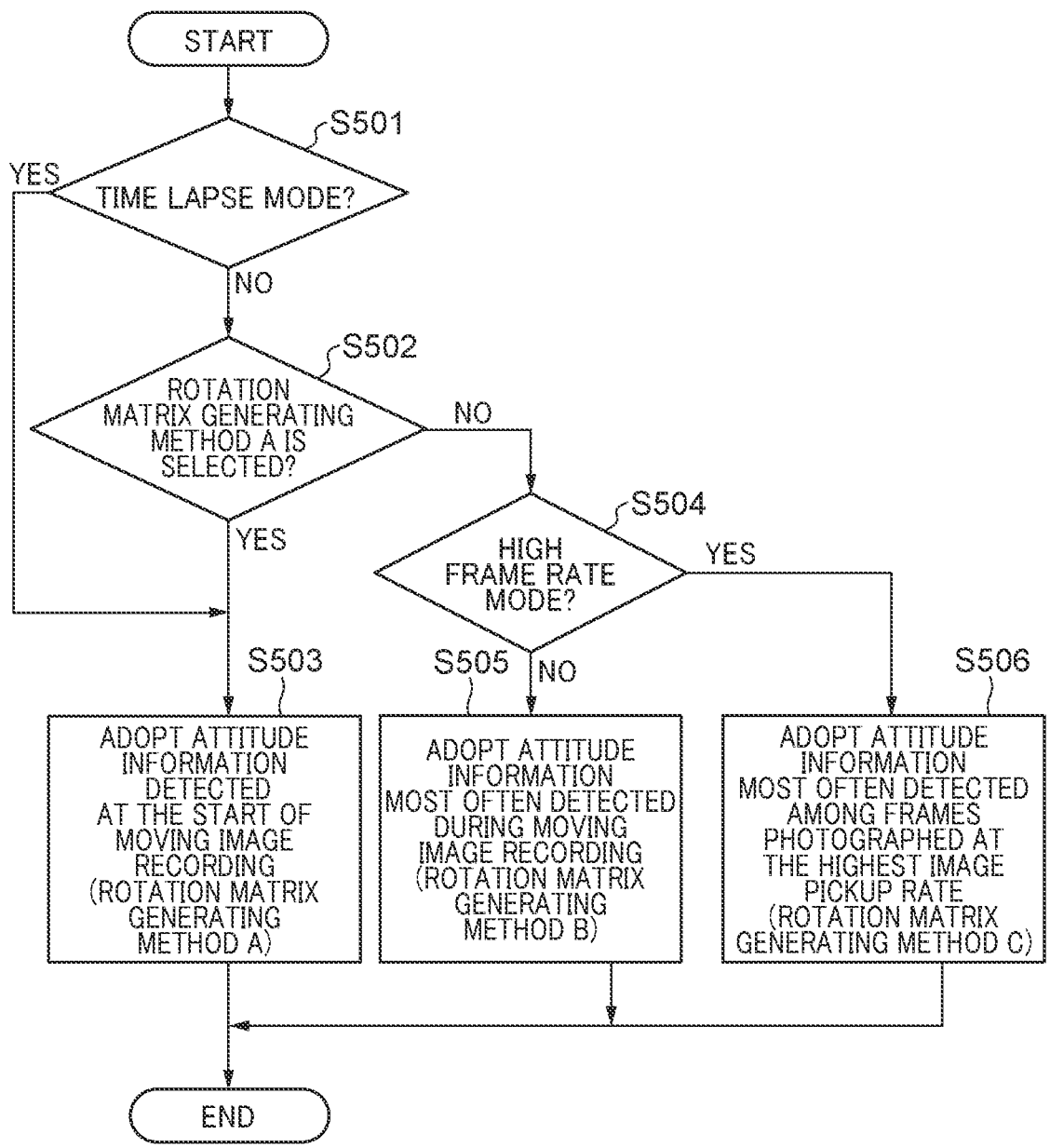
FIG. 5 is a flowchart of a processing that determines a rotation matrix generating method in S402.

In S402, the CPU 109 determines the rotation matrix generating method. Here, the details of the processing of S402 will be described. FIG. 5 is a flowchart of the processing that determines the rotation matrix generating method in S402. Moreover, by operating the operating unit 107, the user can display a selection screen of the rotation matrix generating method on the display device 106 and select the desired rotation matrix generating method from the selection screen.

In S501, the CPU 109 judges whether or not the moving image photographing mode set in S401 is the time lapse mode. In the case of judging that the time lapse mode is set (YES in S501), the CPU 109 advances the processing to S503. On the other hand, in the case of judging that the time lapse mode is not set (NO in S501), the CPU 109 advances the processing to S502.

In S502, the CPU 109 judges whether or not a rotation matrix generating method A (a first matrix generating method) is selected from the selection screen of the rotation matrix generating method, which is displayed on the display device 106. In the case of judging that the rotation matrix generating method A is selected (YES in S502), the CPU 109 advances the processing to S503. On the other hand, in the case of judging that the rotation matrix generating method A is not selected (NO in S502), the CPU 109 advances the processing to S504.

In S503, the CPU 109 adopts the rotation matrix generating method A that generates a rotation matrix by using attitude information detected by the attitude detecting unit 105 at the start of moving image recording (at the start of video recording), thereby ends the processing of S402.

In S504, the CPU 109 judges whether or not the moving image photographing mode is set to the high frame rate mode. In the case of judging that the moving image photographing mode is not set to the high frame rate mode (NO in S504), the CPU 109 advances the processing to S505. The case that the processing proceeds to S505 is a case that the moving image photographing mode is set to the normal mode. In this case, in S505, the CPU 109 adopts a rotation matrix generating method B (a second matrix generating method) that generates a rotation matrix by using attitude information most often detected during the moving image recording, thereby ends the processing of S402.

In the case of judging that the moving image photographing mode is set to the high frame rate mode (YES in S504), the CPU 109 advances the processing to S506. In S506, the CPU 109 adopts a rotation matrix generating method C (a third matrix generating method) that generates a rotation matrix by using attitude information most often detected among frames photographed at the highest image pickup rate, thereby ends the processing of S402.

After the rotation matrix generating method is determined by the processing of S402 in this way, in S403, the CPU 109 judges whether or not an instruction to start the moving image recording has been accepted via the operating unit 107. In the case of judging that the instruction to start the moving image recording has not been accepted (NO in S403), the CPU 109 repeats the processing of S403. On the other hand, in the case of judging that the instruction to start the moving image recording has been accepted (YES in S403), the CPU 109 advances the processing to S404.

In S404, the CPU 109 starts the moving image recording. Specifically, on the RAM 103, the CPU 109 secures a ring buffer for video sample and a working memory for generating the "ftyp" and the "moov". The CPU 109 secures a size in the ring buffer for video sample that can accumulate a plurality of chunks. Moreover, the CPU 109 prepares variables L, M, N, and O for counting the attitude of the image pickup apparatus 100 at the time of obtaining the moving image data (hereinafter the variables L, M, N, and O are referred to as "attitude variables"). In the case that either one of the rotation matrix generating method B and the rotation matrix generating method C is selected by the processing of S402, in S404, the CPU 109 resets the attitude variables L, M, N, and O (sets the attitude variables L, M, N, and O to zero (0)).

In S405, the CPU 109 obtains image data of frame images constituting the moving image data from the image generating unit, and then stores it in the RAM 103. Further, in S405, the CPU 109 performs the compression encoding processing with respect to the image data stored in the RAM 103 by the encoder 104, and then stores compression-encoded data, which is a video sample, in the ring buffer for video sample on the RAM 103. The encoder 104 returns size information of the video sample to the CPU 109, and the CPU 109 reflects the size information of the video sample, which is obtained, in the "stco" and the "stsz" of the video track included in the working memory for generating the "ftyp" and the "moov" on the RAM 103.

In S406, the CPU 109 judges whether or not the rotation matrix generating method A is adopted in S402. In the case of judging that the rotation matrix generating method A is adopted (YES in S406), the CPU 109 advances the processing to S409. On the other hand, in the case of judging that the rotation matrix generating method A is not adopted (NO in S406), the CPU 109 advances the processing to S407.

In S407, the CPU 109 obtains attitude information of the image pickup unit 101 at the time of performing moving image photographing from the attitude detecting unit 105. In S408, the CPU 109 increments the attitude variable L, M, N, or O by 1 based on the attitude information obtained in S407, and then advances the processing to S412. Specifically, in S408, in the case that the attitude (a tilt angle) of the image pickup apparatus 100 indicated by the attitude information is 0°, the CPU 109 increments the attitude variable L by 1; in the case that the attitude (the tilt angle) of the image pickup apparatus 100 indicated by the attitude information is 90°, the CPU 109 increments the attitude variable M by 1; in the case that the attitude (the tilt angle) of the image pickup apparatus 100 indicated by the attitude information is 180°, the CPU 109 increments the attitude variable N by 1; in the case that the attitude (the tilt angle) of the image pickup apparatus 100 indicated by the attitude information is 270°, the CPU 109 increments the attitude variable O by 1. Moreover, the state in which the attitude (the tilt angle) of the image pickup apparatus 100 is 0° means a normal use state, and the state in which the attitude (the tilt angle) of the image pickup apparatus 100 is 90° means a state in which the image pickup apparatus 100 is rotated by 90° in a counterclockwise direction as viewed from the photographer.

In S409, the CPU 109 judges whether or not the image data obtained in S405 is a head frame of the moving image data. In the case of judging that the image data obtained in S405 is the head frame (YES in S409), the CPU 109 advances the processing to S410. On the other hand, in the case of judging that the image data obtained in S405 is not the head frame (NO in S409), the CPU 109 advances the processing to S412.

The content of the processing of S410 is the same as the content of the processing of S407. In S411, the CPU 109 generates a rotation matrix based on the attitude information obtained in S410, reflects the rotation matrix in the "matrix" of the "mvhd" in the working memory for generating the "ftyp" and the "moov" on the RAM 103, and then advances the processing to S412. Specifically, in the case that the attitude (the tilt angle) of the image pickup apparatus 100 indicated by the attitude information is 0°, values shown in FIG. 3C are set in the rotation matrix; in the case that the attitude (the tilt angle) of the image pickup apparatus 100 indicated by the attitude information is 90°, values shown in FIG. 3D are set in the rotation matrix; in the case that the attitude (the tilt angle) of the image pickup apparatus 100 indicated by the attitude information is 180°, values shown in FIG. 3E are set in the rotation matrix; in the case that the attitude (the tilt angle) of the image pickup apparatus 100 indicated by the attitude information is 270°, values shown in FIG. 3F are set in the rotation matrix.

In S412, the CPU 109 judges whether or not the image data of 512 Kbytes or more is accumulated in the ring buffer for video sample on the RAM 103. In the case of judging that the image data of 512 Kbytes or more is accumulated in the ring buffer for video sample on the RAM 103 (YES in S412), the CPU 109 advances the processing to S413. On the other hand, in the case of judging that the image data of 512 Kbytes or more is not accumulated in the ring buffer for video sample on the RAM 103 (NO in S412), the CPU 109 advances the processing to S414.

In S413, the CPU 109 writes the encoded image data to the recording medium 108 in 512-Kbyte unit via a recording medium control unit (not shown). In S414, the CPU 109 judges whether or not the moving image photographing mode is the high frame rate mode. In the case of judging that the moving image photographing mode is the high frame rate mode (YES in S414), the CPU 109 advances the processing to S415. On the other hand, in the case of judging that the moving image photographing mode is not the high frame rate mode (NO in S414), the CPU 109 advances the processing to S418.

In S415, the CPU 109 judges whether or not a frame rate change instruction has been accepted via the operating unit 107. In the case of judging that the frame rate change instruction has been accepted (YES in S415), the CPU 109 advances the processing of S416. On the other hand, in the case of judging that the frame rate change instruction has not been accepted (NO in S415), the CPU 109 advances the processing to S418.

In S416, the CPU 109 changes the frame rate (the image pickup rate) to 120 fps. As a result, an image data generating interval by the image generating unit becomes 120 fps. In S417, the CPU 109 resets counts of the attitude variables L, M, N, and O, and then advances the processing to S418.

In S418, the CPU 109 judges whether or not an instruction to end the moving image recording has been accepted via the operating unit 107. In the case of judging that the instruction to end the moving image recording has not been accepted (NO in S418), the CPU 109 returns the processing to S405. On the other hand, in the case of judging that the instruction to end the moving image recording has been accepted (YES in S418), the CPU 109 advances the processing to S419.

In S419, the CPU 109 judges whether or not either one of the rotation matrix generating method B and the rotation matrix generating method C is adopted. In the case of judging that either one of the rotation matrix generating method B and the rotation matrix generating method C is adopted (YES in S419), the CPU 109 advances the processing of S420. On the other hand, in the case of judging that neither of the rotation matrix generating method B and the rotation matrix generating method C is adopted (NO in S419), the CPU 109 advances the processing to S421.

In S420, the CPU 109 generates a rotation matrix by using the largest value among the attitude variables L, M, N, and O, and reflects the rotation matrix in the "matrix" of the "mvhd" in the working memory for generating the "ftyp" and the "moov" on the RAM 103. Here, in the case that the attitude variable L is the largest, the CPU 109 sets the values shown in FIG. 3C in the rotation matrix; in the case that the attitude variable M is the largest, the CPU 109 sets the values shown in FIG. 3D in the rotation matrix; in the case that the attitude variable N is the largest, the CPU 109 sets the values shown in FIG. 3E in the rotation matrix; in the case that the attitude variable O is the largest, the CPU 109 sets the values shown in FIG. 3F in the rotation matrix.

In S421, the CPU 109 performs a moving image recording end processing. Specifically, the CPU 109 stores the unstored video sample, which is accumulated in the ring buffer for video sample on the RAM 103, in the recording medium 108. Then, the CPU 109 stores the "ftyp" and the "moov", which are generated by the working memory for generating the "ftyp" and the "moov" on the RAM 103, in the recording medium 108, and combines the "ftyp", the "moov", and the "mdat" on the recording medium 108 by means of the file system. As a result, the moving image data file is completed.

As described above, in the first embodiment of the disclosure, according to the moving image photographing mode, the optimum rotation matrix generating method is selected from a plurality of rotation matrix generating methods, and the moving image data is recorded. As a result, it is possible to reduce the occurrence of the feeling of wrongness when reproduction display is performed. Further, since an auxiliary camera that photographs the photographer is not required, the image pickup apparatus can be downsized and the cost can be reduced. Furthermore, in the case that the attitude of the image pickup apparatus 100 is changed, a part of the moving image file will not be deleted.

Next, a second embodiment of the disclosure will be described. In the second embodiment, a method of generating a moving image data file in an image pickup apparatus having an operation mode (hereinafter referred to as "a Pre-REC mode"), which records not only still images but also moving images (video samples) before recording the still images when photographing the still images, will be described. The configuration of the image pickup apparatus is the same as the configuration of the image pickup apparatus 100 according to the first embodiment, except that the CPU 109 stores a program for executing the Pre-REC mode in its own ROM.

Figure 6:
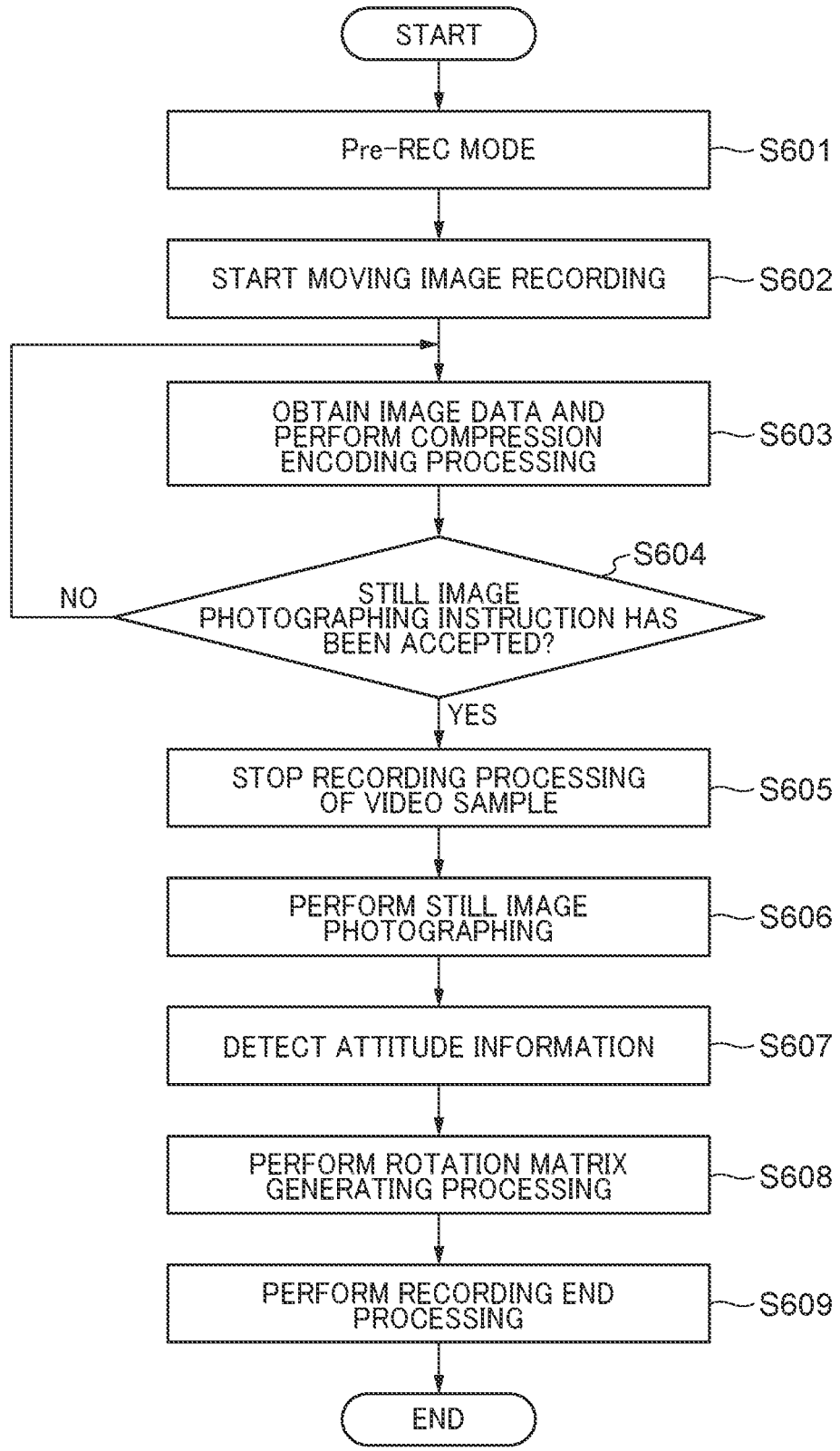
FIG. 6 is a flowchart that explains a method of generating a moving image data file in a Pre-REC mode.

FIG. 6 is a flowchart that explains the method of generating a moving image data file in the Pre-REC mode. Each processing (step) indicated by the S number in FIG. 6 is realized by the CPU 109 expanding the program stored in its own ROM on its own RAM and integrally controlling the operation of each block of the image pickup apparatus 100. Moreover, a frame rate for recording a video sample is, for example, 30 fps, but the frame rate for recording a video sample is not limited to this.

In S601, the CPU 109 accepts the designation of the Pre-REC mode via the operating unit 107. Since the processing of S602 is the same as the processing of S404 in the flowchart of FIG. 4 and the processing of S603 is the same as the processing of S405 in the flowchart of FIG. 4, the description thereof will be omitted here. In S604, the CPU 109 judges whether or not a still image photographing instruction has been accepted via the operating unit 107. In the case of judging that the still image photographing instruction has been accepted (YES in S604), the CPU 109 advances the processing to S605. On the other hand, in the case of judging that the still image photographing instruction has not been accepted (NO in S604), the CPU 109 returns the processing to S603.

In S605, the CPU 109 stops the recording processing of the video sample. In S606, the CPU 109 performs a still image photographing processing. Specifically, image data is generated by the image generating unit (the image pickup unit 101 and the signal processing unit 102) and temporarily stored in the RAM 103. The image data is accumulated in the RAM 103 after being subjected to a predetermined compression encoding processing by the encoder 104. Moreover, the compression encoding processing for the still image data may be the same as or different from the compression encoding processing for the moving image data at the time of recording the video sample. Further, the encoder that performs the compression encoding processing with respect to the still image data may be different from the encoder that performs the compression encoding processing with respect to the moving image data. The compression encoding processing may not be performed with respect to the still image data.

Since the processing of S607 is the same as the processing of S407 in the flowchart of FIG. 4, the description thereof will be omitted. In S608, the CPU 109 generates a rotation matrix based on the attitude information detected by the attitude detecting unit 105 in S607, and reflects the rotation matrix in the "matrix" of the "mvhd" in the working memory for generating the "ftyp" and the "moov". For example, in the case that the tilt angle of the image pickup apparatus 100 indicated by the attitude information is 0°, the values shown in FIG. 3C are set in the rotation matrix; in the case that the tilt angle of the image pickup apparatus 100 indicated by the attitude information is 90°, the values shown in FIG. 3D are set in the rotation matrix; in the case that the tilt angle of the image pickup apparatus 100 indicated by the attitude information is 180°, the values shown in FIG. 3E are set in the rotation matrix; in the case that the tilt angle of the image pickup apparatus 100 indicated by the attitude information is 270°, the values shown in FIG. 3F are set in the rotation matrix.

In S609, the CPU 109 performs a recording end processing. Specifically, the CPU 109 stores the video sample, which is accumulated in the ring buffer for video sample on the RAM 103, in the recording medium 108. Then, the CPU 109 stores the "ftyp" and the "moov", which are generated by the working memory for generating the "ftyp" and the "moov" on the RAM 103, in the recording medium 108, and combines the "ftyp", the "moov", and the "mdat" on the recording medium 108 by means of the file system. As a result, the moving image data file is completed. Further, the CPU 109 stores the still image data, which is stored in the RAM 103 in S606, in the recording medium 108. By performing such a series of processing, the same effect as that of the first embodiment can be obtained in the second embodiment.

Next, a third embodiment of the disclosure will be described. In the third embodiment, a method of determining a rotation matrix and a method of generating a moving image data file in an image pickup apparatus having a communication unit that accepts operation instructions from an external apparatus will be described.

Figure 7:
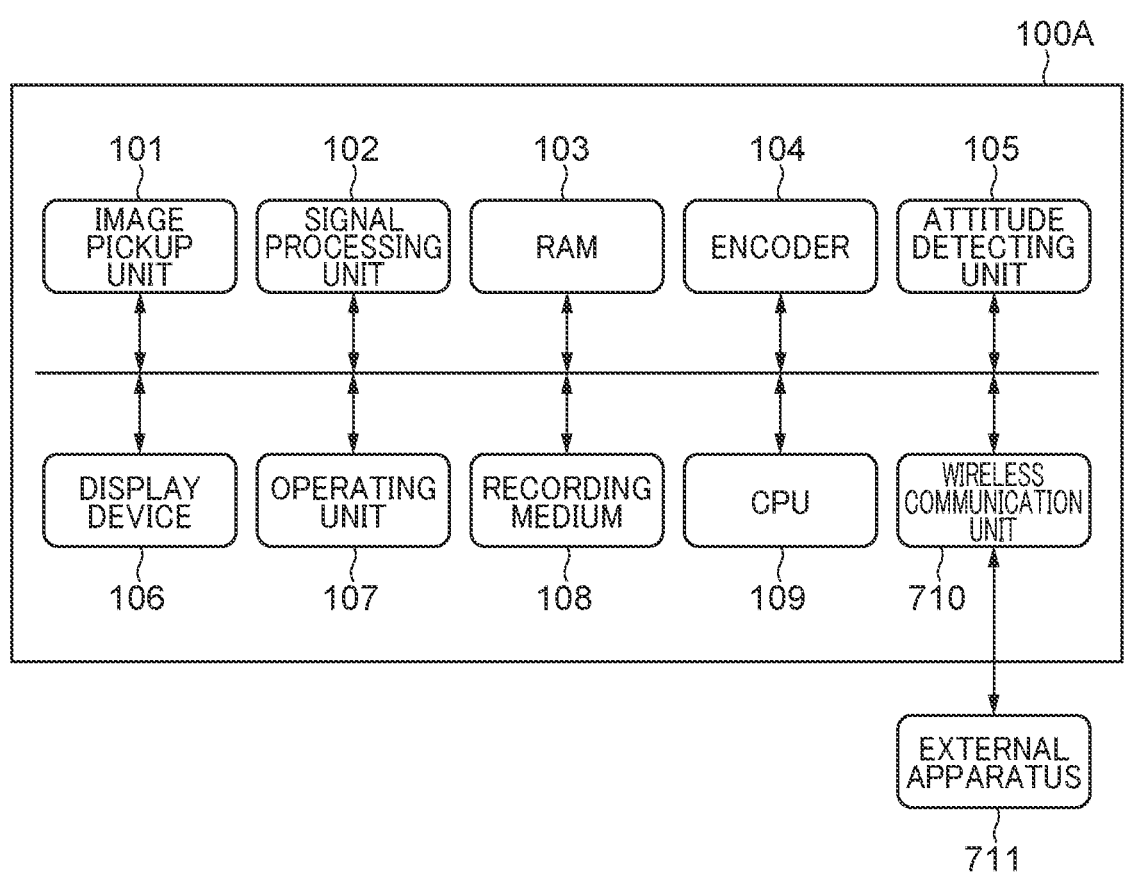
FIG. 7 is a block diagram that shows a schematic configuration of an image pickup apparatus according to a third embodiment of the disclosure.

FIG. 7 is a block diagram that shows a schematic configuration of an image pickup apparatus 100A according to the third embodiment of the disclosure. The image pickup apparatus 100A is configured by adding a wireless communication unit 710 capable of executing wireless communications with an external apparatus 711 to the image pickup apparatus 100 according to the first embodiment. The configurations of the other blocks of the image pickup apparatus 100A are the same as the configurations of the blocks of the image pickup apparatus 100.

The wireless communication unit 710 transmits/receives signals to/from the external apparatus 711 by using various kinds of wireless communication methods. Moreover, publicly known communication methods can be used as the wireless communication methods, and the wireless communication methods are not particularly limited. As shown in FIG. 7, the external apparatus 711 is physically separated from the image pickup apparatus 100A, and the external apparatus 711 transmits/receives signals to/from the image pickup apparatus 100A via a wireless communication unit (not shown) included in the external apparatus 711. For example, commands, which are the same as commands that can be inputted via the operating unit 107 of the image pickup apparatus 100A, can be inputted via an operating unit (not shown) of the external apparatus 711.

A recording processing of the moving image data in the image pickup apparatus 100A is the same as the recording processing of the moving image data in the image pickup apparatus 100 according to the first embodiment, except for the difference in the processing of S402 in the flowchart of FIG. 4. In the processing of S402 in the image pickup apparatus 100A, in the case that the photographing instruction is given via the external apparatus 711, the CPU 109 adopts the rotation matrix generating method A. On the other hand, in the case that the photographing instruction is given via the operating unit 107 instead of the external apparatus 711, the CPU 109 adopts the rotation matrix generating method B or the rotation matrix generating method C according to the judgement of S504. By performing such a series of processing, the same effect as that of the first embodiment can be obtained in the third embodiment.

Although the disclosure has been described in detail based on the exemplary embodiments thereof, the disclosure is not limited to these specific embodiments, and various embodiments within the range not deviating from the gist of the disclosure are also included in the disclosure. Further, each of the above-described embodiments is merely an embodiment of the disclosure, and each of the above-described embodiments can be appropriately combined.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-102464, filed Jun. 21, 2021, which is hereby incorporated by reference herein in its entirety.

What is claimed is:

1. An apparatus comprising:
a pickup unit;
a detecting unit configured to detect an attitude of the pickup unit;
a rotation matrix generating unit configured to generate a rotation matrix, which is used for correcting an angle when a reproducing apparatus displays a moving image photographed by the pickup unit, by means of one of a plurality of rotation matrix generating methods and based on the detected attitude;
an encoder configured to encode image data of the moving image;
a selecting unit configured to select one rotation matrix generating method from the plurality of rotation matrix generating methods according to an operation mode of the pickup unit when the moving image is photographed by the pickup unit; and
a file generating unit configured to generate a data file by including the rotation matrix, which is generated by means of the selected rotation matrix generating method, in the encoded image data in a format, in which the angle when the reproducing apparatus displays the moving image can be corrected by the rotation matrix.

2. The apparatus according to claim 1, wherein
the plurality of rotation matrix generating methods includes;
a first matrix generating method that determines the rotation matrix based on the attitude of the pickup unit detected when recording a head frame of the moving image;
a second matrix generating method that determines the rotation matrix based on the attitude of the pickup unit most often detected during recording of the moving image; and
a third matrix generating method that determines the rotation matrix based on the attitude of the pickup unit most often detected among frames photographed at the highest image pickup rate during recording of the moving image.

3. The apparatus according to claim 2, wherein
the pickup unit has a first operation mode that performs photographing at a first frame rate, and
the selecting unit selects the first matrix generating method in a case that photographing in the first operation mode is performed.

4. The apparatus according to claim 3, wherein
the pickup unit has a second operation mode that performs photographing at a second frame rate higher than the first frame rate, and
the selecting unit selects the second matrix generating method in a case that photographing in the second operation mode is performed.

5. The apparatus according to claim 4, wherein
the pickup unit has a third operation mode in which frame rate change can be performed between a third frame rate higher than the second frame rate and the second frame rate, and
the selecting unit selects the third matrix generating method in a case that photographing in the third operation mode is performed.

6. The apparatus according to claim 2, further comprising:
a communication unit configured to accept instructions from an external apparatus,
wherein, in a case of accepting an instruction to photograph a moving image from the external apparatus via the communication unit, the selecting unit selects the first matrix generating method.

7. The apparatus according to claim 1, further comprising:
an operating unit configured to accept operations from the outside, wherein the selecting unit selects a rotation matrix generating method accepted via the operating unit from the plurality of rotation matrix generating methods.

8. The apparatus according to claim 2, wherein
the pickup unit has a fourth operation mode that records a still image and a moving image before recording the still image,
the plurality of rotation matrix generating methods includes a fourth matrix generating method that determines the rotation matrix based on the detected attitude of the pickup unit when accepting an instruction to record a still image, and
the selecting unit selects the fourth matrix generating method in a case that the fourth operation mode is set.

9. An apparatus comprising:
an obtaining unit configured to obtain a moving image photographed by a pickup unit together with attitude information, which indicates an attitude of the pickup unit at the time of photographing the moving image;
a rotation matrix generating unit configured to generate a rotation matrix, which is used for correcting an angle when a reproducing apparatus displays the moving image, by means of one of a plurality of rotation matrix generating methods and based on the attitude information;
an encoder configured to encode image data of the moving image;
a selecting unit configured to select one rotation matrix generating method from the plurality of rotation matrix generating methods according to an operation mode of the pickup unit when the moving image is photographed by the pickup unit; and
a file generating unit configured to generate a data file by including the rotation matrix, which is generated by means of the selected rotation matrix generating method, in the encoded image data in a format, in which the angle when the reproducing apparatus displays the moving image can be corrected by the rotation matrix.

10. The apparatus according to claim 9, wherein
the plurality of rotation matrix generating methods includes;
a first matrix generating method that determines the rotation matrix based on attitude information of a head frame of the moving image;
a second matrix generating method that determines the rotation matrix based on attitude information most often detected during recording of the moving image; and
a third matrix generating method that determines the rotation matrix based on attitude information most often detected among frames photographed at the highest image pickup rate during recording of the moving image.

11. A method for an apparatus, comprising:
photographing a moving image by a pickup unit;
detecting an attitude of the pickup unit when the moving image is photographed;
selecting one rotation matrix generating method according to an operation mode of the pickup unit when the moving image is photographed from a plurality of rotation matrix generating methods, each of which generates a rotation matrix used for correcting an angle when a reproducing apparatus displays a moving image obtained by the pickup unit based on the attitude of the pickup unit;
encoding image data of the moving image;
generating a data file by including the rotation matrix, which is generated by means of the selected rotation matrix generating method, in the encoded image data in a format, in which the angle when the reproducing apparatus displays the moving image can be corrected by the rotation matrix; and
recording the data file in a recording medium.

12. The method according to claim 11, wherein
the plurality of rotation matrix generating methods includes;
a first matrix generating method that determines the rotation matrix based on the attitude of the pickup unit detected when recording a head frame of the moving image;
a second matrix generating method that determines the rotation matrix based on the attitude of the pickup unit most often detected during recording of the moving image; and
a third matrix generating method that determines the rotation matrix based on the attitude of the pickup unit most often detected among frames photographed at the highest image pickup rate during recording of the moving image.

13. The method according to claim 12, wherein
the pickup unit has a first operation mode that performs photographing at a first frame rate, and
the selecting selects the first matrix generating method in a case that photographing in the first operation mode is performed.

14. The method according to claim 12, further comprising accepting instructions from an external apparatus by a communication unit,
wherein, in a case of accepting an instruction to photograph a moving image from the external apparatus via the communication unit, the selecting selects the first matrix generating method.

15. The method according to claim 11, further comprising accepting operations from the outside by an operating unit,
wherein the selecting selects a rotation matrix generating method accepted via the operating unit from the plurality of rotation matrix generating methods.

16. A non-transitory computer-readable storage medium storing a program for causing a computer to execute a control method for an apparatus, comprising:
photographing a moving image by a pickup unit;
detecting an attitude of the pickup unit when the moving image is photographed;
selecting one rotation matrix generating method according to an operation mode of the pickup unit when the moving image is photographed from a plurality of rotation matrix generating methods, each of which generates a rotation matrix used for correcting an angle when a reproducing apparatus displays a moving image obtained by the pickup unit based on the attitude of the pickup unit;
encoding image data of the moving image;
generating a data file by including the rotation matrix, which is generated by means of the selected rotation matrix generating method, in the encoded image data in a format, in which the angle when the reproducing apparatus displays the moving image can be corrected by the rotation matrix; and
recording the data file in a recording medium.

17. The non-transitory computer-readable storage medium according to claim 16, wherein the plurality of rotation matrix generating methods includes;

a first matrix generating method that determines the rotation matrix based on the attitude of the pickup unit detected when recording a head frame of the moving image;

a second matrix generating method that determines the rotation matrix based on the attitude of the pickup unit most often detected during recording of the moving image; and a third matrix generating method that determines the rotation matrix based on the attitude of the pickup unit most often detected among frames photographed at the highest image pickup rate during recording of the moving image.

18. The non-transitory computer-readable storage medium according to claim 17, wherein the pickup unit has a first operation mode that performs photographing at a first frame rate, and the selecting selects the first matrix generating method in a case that photographing in the first operation mode is performed.

19. The non-transitory computer-readable storage medium according to claim 17, further comprising accepting instructions from an external apparatus by a communication unit, wherein, in a case of accepting an instruction to photograph a moving image from the external apparatus via the communication unit, the selecting selects the first matrix generating method.

20. The non-transitory computer-readable storage medium according to claim 16, further comprising accepting operations from the outside by an operating unit, wherein the selecting selects a rotation matrix generating method accepted via the operating unit from the plurality of rotation matrix generating methods.

* * * * *